Jan. 31, 1939. R. W. GROOT Re. 20,993

CENTRIFUGAL SWITCH

Original Filed Sept. 7, 1934 2 Sheets-Sheet 1

Inventor:
Robert W. Groot,
by Harry E. Dunham
His Attorney.

CENTRIFUGAL SWITCH

Original Filed Sept. 7, 1934 2 Sheets-Sheet 2

Inventor:
Robert W. Groot,
by Harry E. Dunham
His Attorney.

Reissued Jan. 31, 1939

Re. 20,993

UNITED STATES PATENT OFFICE 20,993

CENTRIFUGAL SWITCH

Robert W. Groot, Fort Wayne, Ind., assignor to General Electric Company, a corporation of New York Original No. 2,084,907, dated June 22, 1937, Serial No. 743,110, September 7, 1934. Application for reissue June 24, 1937, Serial No. 150,147

11 Claims. (Cl. 200—80)

My invention relates to centrifugal switches and more particularly to improvements in the construction of such switches.

Centrifugal switches of the so-called center contact type, wherein a rotatable member carrying a centrifugally actuated contact which is movable along the axis of rotation of the rotatable member and which cooperates with an axially positioned stationary contact, have been found difficult to keep in proper operating condition, as it is necessary for the contacts to be extremely true and smooth in order to prevent objectionable contact noise or squealing. As the contacts naturally tend to pit or burn and become rough in service, such switches require frequent dressing of the contacts in order to give satisfactory service. Accordingly, in my switch the contacts are mounted off-center, with the contact surfaces in a plane perpendicular to the axis of rotation of the rotatable member. With such a construction, the resultant windage is beneficial to the action of the contacts in that it serves to cool them and to blow out arcs between them. However, in order to adjust the setting of the switch during its operation, it is usually necessary to have an axially movable adjustable means for cooperation with an axially positioned element on the rotatable member with the result that wear and some noise is produced by these adjustable members.

In accordance with my invention, however, I provide a novel construction in which centrifugal force is utilized to reduce and minimize the force between the stationary and the rotatable elements of the adjusting means of the switch so that under the normal operating speed of the switch the pressure between the elements of the adjusting means is relatively insignificant.

An object of my invention is to provide a new and improved centrifugal switch.

A further object of my invention is to provide a speed adjusting means for centrifugal switches with a centrifugal element which serves to reduce the wear in the adjusting means.

My invention will be better understood from the following description taken in connection with the accompanying drawings and its scope will be pointed out in the appended claims.

Figure 1:
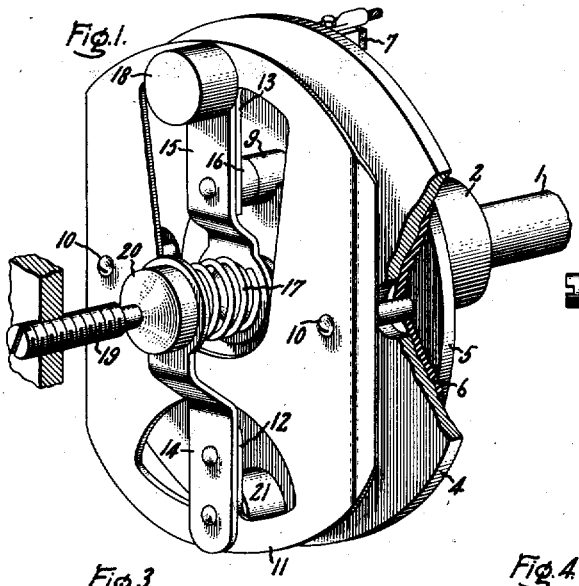
Figure 2:
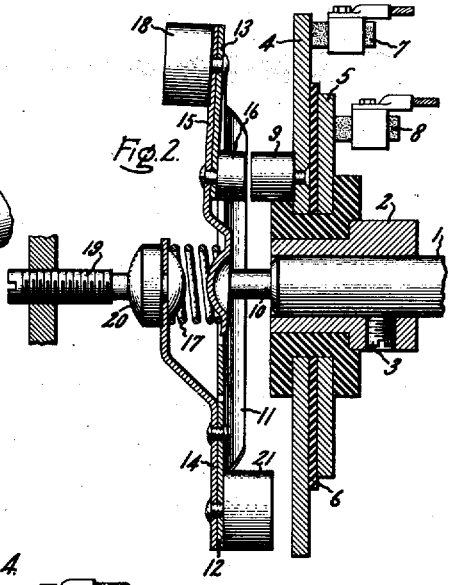
Figure 3:
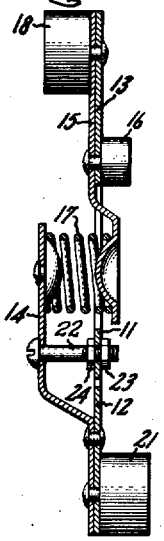
Figure 4:
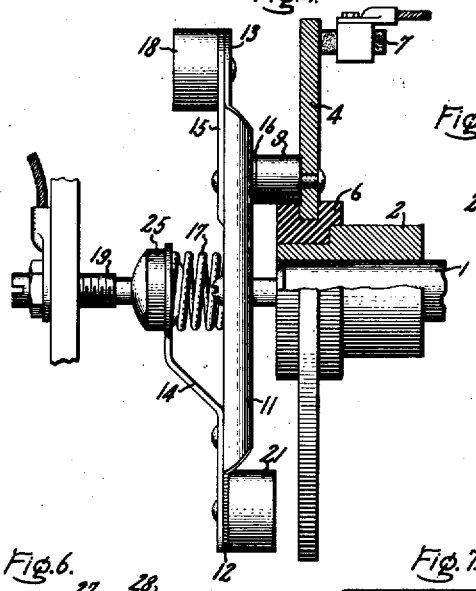
Figure 5:
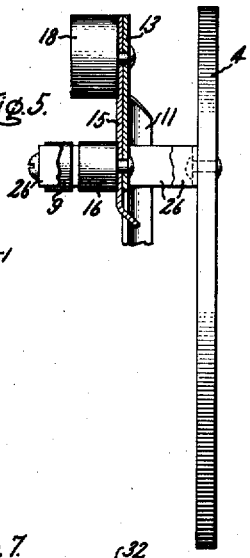
Figure 6:
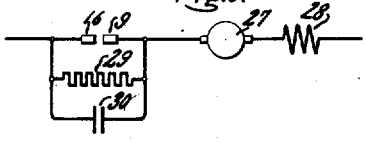
Figure 7:
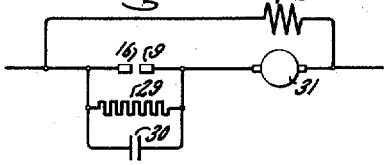
Figure 8:
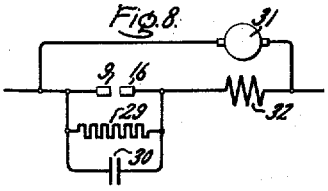
Figure 9:
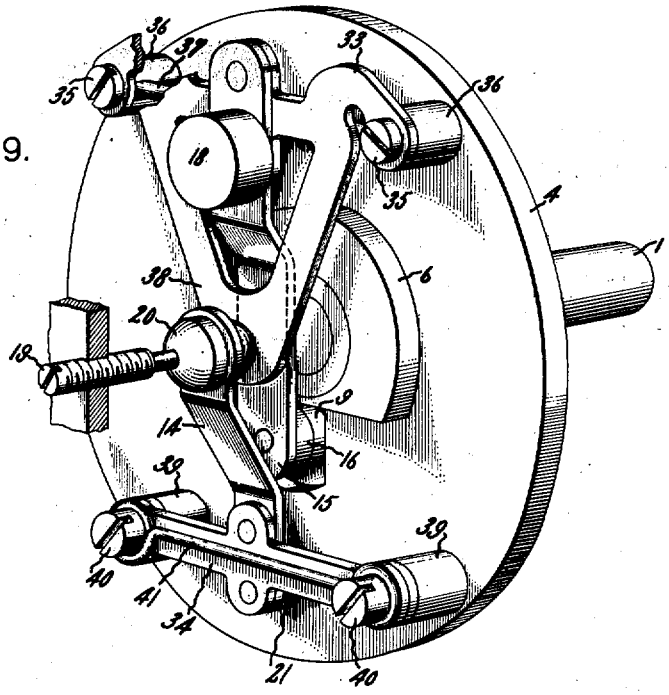
Figure 10:
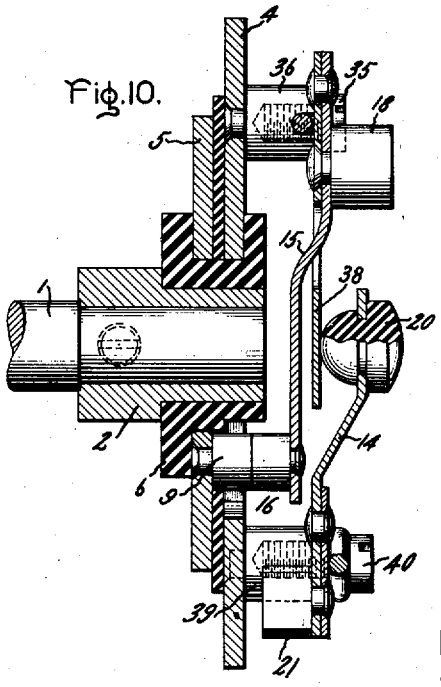

In the drawings, in which like reference characters designate similar elements throughout the several views, Fig. 1 is a perspective view of one embodiment of my invention; Fig. 2 is a cross-sectional view of the switch shown in Fig. 1; Fig. 3 illustrates a modified speed adjusting means for a single speed switch; Fig. 4 illustrates a modified way of making the electrical connections to my switch; Fig. 5 is an additional modification showing the contacts of my switch reversed; Fig. 6 is a circuit diagram illustrating an application of my switch for controlling the speed of a series motor; Fig. 7 is a circuit diagram illustrating an application of my switch to the armature circuit of a shunt motor; Fig. 8 is a circuit diagram illustrating an application of the modified switch shown in Fig. 5 to the field circuit of a shunt motor; Fig. 9 is a perspective view of an additional modification of my switch; and Fig. 10 is a part sectional view of the switch shown in Fig. 9.

Referring now to the drawings and more particularly to Figs. 1 and 2 thereof, a shaft 1, which may for example be the shaft of an electric motor whose speed is controlled by my switch, has mounted thereon a rotatable member 2 which is fastened to the shaft in any suitable manner, such as by a set screw 3. Mounted on rotatable member 2 are metal collector elements 4 and 5 which are preferably circular in shape and which are shown as discs, although it will of course be obvious to those skilled in the art that conventional collector rings may also be employed if desired. Elements 4 and 5 are insulated from the member 2 and from each other by suitable insulating material, such as hard rubber 6. Cooperating with the collector discs 4 and 5, respectively, are brushes 7 and 8 to which the electrical connections to the switch may be made. Electrically connected to metal collector disc 4, and preferably also supported thereby, is an off-center contact 9, which as shown by way of example, is riveted to the disc 4. Supported by the rotatable member 2, through the medium of collector disc 5 and metal screw studs 10, is a metal frame or plate 11 which may be made of any suitable material, such for example, as phosphor bronze. Plate 11 is provided with opposite cutaway portions into which project integral fingers 12 and 13. Extensions 14 and 15 are fastened, respectively, to the fingers 12 and 13 and these extensions have overlapping portions in the axis of rotation of the device. Mounted on finger 13 and extension 15 thereof is a contact 16 for cooperation with the contact 9. Interposed between the overlapping extensions 14 and 15 is a compression spring 17 which serves to bias the finger 13, carrying the contact 16, in such a direction as to cause contact 16 normally to engage contact 9.

For actuating the contact 16 there is an off-center mounted weight 18 fastened to the finger 13 and plate 11.

For adjusting the speed setting of the switch there is provided an adjustment screw 19 which bears against a bearing member, such as a fibre of "Bakelite" button 20 set in the extension 14. By turning the screw 19 the compression of the biasing spring 17 can be adjusted, thereby adjusting, in a manner to be described more in detail hereinafter, the speed at which the contacts of the switch open.

For relieving the force and wear of the adjusting means of the switch I provide another off-center weight 21 which is fastened by suitable means, such as by riveting, to the finger 12 and plate 11.

The operation of the switch shown in Figs. 1 and 2 is as follows: In Fig. 1 the parts are shown in the positions they assume when the switch is at rest. If now the shaft 1 is rotationally accelerated the centrifugal force on weight 18 will produce a bending moment tending to turn the finger 13 counter-clockwise (as viewed in Fig. 2) about a center approximately at the point where weight 18 is fastened to the arm 13. This is because the centrifugal force on weight 18 is in a radial direction passing through the center of gravity of the weight 18 and the center of gravity is at a distance of approximately half the thickness of the weight 18 from its point of fastening to the arm 13. This distance corresponds to the arm of the bending moment. When a certain critical speed is reached, which speed is determined by the compression of spring 17 and the resilience of arm 13 and the torsional resistance of the portion of plate 11 to which it is integrally attached, the centrifugal bending moment produced by the weight 18 will be sufficient to cause the contact 16 to move out of engagement with the contact 9, as is shown in Fig. 2. Consequently, an electric circuit from brush 7 through disc 4, contact 9, contact 16, stud 10, disc 5 and brush 8 will be interrupted by the separation of the contacts 9 and 16.

At the same time that the above described action is taking place, a similar bending moment is being produced by the weight 21 on the arm 12 and extension 14, and this bending moment is in such a direction as to cause arm 14 to tend to compress spring 17, thereby relieving most of the pressure or friction between the screw 19 and the button 20. Weight 21 is so proportioned that the bending moment it produces is never sufficient to cause button 20 to leave screw 19, as this of course would change the calibration or setting of the switch. The bending moment produced by weight 21 is merely sufficient to relieve most of the pressure between button 20 and screw 19 so that wear and noise between these two elements is greatly minimized.

Due to the fact that fingers 12 and 13 are integral with the plate 11 these fingers are in effect mounted on frictionless hinges and go through their various ranges of movement without causing any wear or requiring lubrication of any parts.

By screwing adjusting screw 19 inwardly the compression of spring 17 is increased so that it requires a higher speed of rotation of shaft 1 to cause the contacts 9 and 16 to separate. Conversely, unscrewing the adjustable screw 19 weakens the compression of spring 17 and allows the contacts to open at a lower speed.

The modification shown in Fig. 3 is adapted for constant speed operation and the speed adjusting means is carried on the rotatable member instead of being stationary, so that once the speed is set it cannot be changed unless the switch is brought to rest. In this modification a screw 22 is passed between extension 14 and the part of the plate 11 which is opposite thereto and a nut 23 and a lock-nut 24 are provided thereon on opposite sides of the plate 11. By adjusting the distance between plate 11 and arm 14 the compression of spring 17 can be adjusted thereby adjusting the speed setting of the switch in the manner previously described.

In the modification shown in Fig. 4, but a single collector element is employed and current is led into the switch through the adjusting screw 19 and a metal contact member 25 which takes the place of the fibre or Bakelite button 20. With such a construction, the plate 11 is mounted directly on the member 2 instead of being mounted indirectly thereon through the interposition of the second collector element 5, as in Figs. 1 and 2.

In the modification shown in Fig. 5, the contacts have been reversed, that is to say, contact 16 is mounted on the other side of extension 15 and finger 13, and contact 9 is mounted for engagement with contact 16 by means of a suitable bracket 26 extending from the collector disc 4 around the arm 13 and extension 15. With this arrangement of the contacts they are normally open and when the critical speed is attained the flexing of the finger 13 and extension 15 causes the engagement of the contacts. The modification shown in Fig. 5 may obviously be applied either to the switch of Figs. 1 and 2 or to the switch of Fig. 3 or to the switch of Fig. 4.

In Fig. 6 a series motor 27 having a series field winding 28 is controlled by the switch contacts 9, 16 of the switches shown in either Figs. 1 and 2, or in Figs. 3 or 4. For this purpose it is preferable to connect a regulating resistor 29 across the contacts of the switch and also to connect a discharge capacitor 30 across the contacts for minimizing sparking thereof. With this arrangement, the contacts 9 and 16 are normally in engagement so that when the circuit including the motor 27 is energized from any suitable current source (not shown) the motor comes up to speed and as soon as the critical speed is reached the contacts 9 and 16 open, thereby inserting the resistor 29 in series with the motor which limits the voltage applied thereto so that the motor speed is reduced, but as soon as it falls below the critical speed the contacts close thereby short-circuiting the resistor 29 and the motor again increases in speed. This action, however, is extremely rapid and due to the inertia of the motor there are no sudden changes in speed and it operates at a substantially uniform and constant speed.

In Fig. 7 a shunt motor 31 having a shunt field winding 32 is controlled by my switch, of the types shown in Figs. 1, 2, 3 or 4, having its contacts 9 and 16 connected in the armature circuit of the motor. With this arrangement the contacts are normally closed so that the motor comes up to speed but when the critical speed is reached the contacts open thereby inserting the resistor 29 in the armature circuit thereby reducing the voltage on the armature with the result that the speed of the motor is decreased. However, as soon as the speed decreases below the critical value the contacts again close as has just been described in connection with Fig. 6, and this results in holding the speed of the motor 7 substantially constant.

In Fig. 8 the shunt motor 31 is controlled by a switch having its contacts in circuit with the field 32. In order to control the speed of the motor in this manner the contacts must close on overspeed instead of opening on overspeed and consequently a switch having contacts arranged as in Fig. 5 must be employed. With this arrangement the contacts 9, 16 are normally open, thereby causing the field current to flow through the resistor 9 and weakening the field of the motor. This causes the motor to tend to operate at overspeed but as soon as the critical speed is reached the contacts close thereby short-circuiting the resistor 29 and increasing the current to the field 32 thereby reducing the motor speed. This cycle is then repeated rapidly with the result that the average motor speed is held constant.

In the modification shown in Figs. 9 and 10 the plate, or frame, member 11 has been replaced by two frame members 33 and 34. The frame 33 is fastened to the collector disc 4 by means of screws 35 threaded into studs 36. I have found that in some cases the hinges produced by the flexing of portions of the plate or frame 11 of the modifications shown in Figs. 1 to 5, inclusive, became distorted and weaved at certain speeds. In order to overcome this I have provided a relatively rigid rod or bar 37 which is mounted in slots in the studs 36, and this rod 37 is adjacent the hinge or flexing portion of the frame 33 and thus prevents distortion and weaving. As shown, the frame 33 carries the finger or arm 15 for carrying the movable contact 16. Frame 33 is also provided with an extension 38 for cooperation directly with speed adjusting button 20. With this construction, it is possible to eliminate entirely the helical spring 17 of the previously described modifications and this is sometimes desirable, as I have found that at times the helical spring tends to flutter, and thus upset the speed setting of the switch. In the modification shown in Figs. 9 and 10 the biasing spring for the adjustable contact 16 is formed by the extension 38, the resilient hinge of the member 33 and the finger 15, all of which elements are resilient, so that when screw 19 is turned inwardly causing button 20 to push against extension 38, the biasing force on the contact 16 is increased thereby requiring a greater speed of rotation of the switch for the centrifugal weight 18 to cause contact 16 to leave the contact 9.

I have also found that in some cases better contact action is secured if the contacts are placed on the opposite side of the center of the switch from the hinge for the movable contact, and as shown in Figs. 9 and 10, the finger 15 extends beyond the center of rotation of the switch. With the longer lever arm thus produced, a wider and more positive contact opening is secured.

It should also be noted that in the modification shown in Figs. 9 and 10 the contacts have been reversed with respect to the collector discs or elements so that the stationary contact 9 is carried by the smaller disc 5 while the movable contact 16 is carried by the larger disc 4.

The resilient frictionless hinge member 34 is mounted on studs 39 by means of screws 40 and for bracing the hinge and preventing distortion thereof there is provided a relatively rigid rod member 41 having eyelets through which the screws 40 are passed.

Although the arm 14 of the speed adjusting mechanism of my switch is shown mounted on a frictionless resilient hinge in the various modifications of my invention which I have described, it should be noted that such mounting is not really necessary and that due to the fact that the force for operating the speed adjusting mechanism, which is produced by the screw 19, is ample to operate this mechanism regardless of any ordinary amount of friction in the hinge, it would be entirely feasible to substitute a conventional hinge for the hinges shown in the various modifications of the speed adjusting means.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In a centrifugal switch, a rotatable member carrying a pair of contacts, a biasing spring for one of said contacts carried by said member, means for adjusting the biasing force of said spring, and centrifugally actuated means carried by said member for reducing the force of said spring on said adjusting means.

2. In a centrifugal switch, a rotatable member carrying a pair of contacts, a biasing spring for one of said contacts, a movable element carried by said member and bearing against said spring, adjustable means for varying the force of said element against said spring, and a centrifugally actuated weight for varying the force of said element against said spring in the same direction as said adjustable means whereby the counterforce on said adjustable means is reduced in accordance with increases in the speed of said member.

3. In a centrifugal switch, a rotatable member carrying a pair of contacts, a biasing spring for one of said contacts carried by said member, a normally stationary adjustable member cooperating with said spring for adjusting the biasing force thereof, and centrifugally operated means carried by said rotatable member for reducing the force exerted by said spring on said adjustable member in accordance with increases in speed of said rotatable member.

4. A centrifugal switch comprising, in combination, a rotatable member, a circular collector element mounted on said member for rotation about an axis perpendicular to said element, a contact carried by said element beyond the center of rotation thereof and having its contact face parallel to the plane of rotation of said element, a metal frame carried by said member, a contact carrying finger on said frame, a contact carried by said finger for cooperation with the first mentioned contact, and a weight fastened to said finger in such a manner that the centrifugal force produced thereby by the rotation of said member moves said finger.

5. A centrifugal switch comprising, in combination, a rotatable member, a pair of relatively insulated collector discs mounted thereon, a contact attached to one of said discs, a metal frame attached to the other of said discs, said frame having a cut-away portion around an inwardly extending finger, a contact carried by said finger for cooperation with the first mentioned contact, and an off-center weight attached to said finger for producing a centrifugal force in a direction to move said finger in response to the rotation of said member.

6. In a centrifugal switch, a rotatable member, a circular collector element carried thereby, an off-center contact connected to said element, a metal plate carried by said member, said plate having cut-away portions around two inwardly extending fingers on said plate, a helical compression spring between the inner ends of said fingers, a contact carried by one of said fingers for cooperation with the first mentioned contact, and separate centrifugal weights carried by each of said fingers for urging them toward each other in response to rotation of said member.

7. In a centrifugal switch, a rotatable member, a pair of relatively insulated circular collector elements carried thereby, an off-center contact carried by one of said elements, a metal frame carried by the other of said elements, said frame having cut-away portions around inwardly extending overlapping metal fingers, a compression spring between the overlapping portions of said fingers, a contact carried by one of said fingers and cooperating with the first mentioned contact, an off-center weight fastened to the contact carrying fingers for producing a centrifugal force in a direction to flex the contact carrying finger against the compression of said spring, normally stationary means for adjusting the compression of said spring, and an off-center weight fastened to the other finger for producing a centrifugal force in a direction tending to flex the other contact finger against the compression of said spring.

8. In a centrifugal switch, a rotatable member, a relatively fixed contact carried thereby, a resilient metal frame carried by said member, said frame having a finger carrying a movable contact for cooperation with said fixed contact, means adjustable along the axis of said rotatable member for flexing said frame and thereby adjusting the setting of said switch, and centrifugally actuated means carried by said member for reducing the force on said adjustable means caused by the flexing of said resilient frame.

9. A centrifugal switch adapted by the vibratory engagement of its contacts to maintain the speed of an electric motor substantially constant comprising, in combination, a rotatable member, a contact fixedly mounted off-center on to said rotatable member, a movable centrifugally actuated contact adapted for vibratory engagement with said fixed contact, an arm mounted off center on said rotatable member for carrying said movable contact, said arm having an effective pivot on the diametrically opposite side of said member from said fixed contact, resilient means for supporting said arm and for biasing said movable contact in a direction opposite to that in which centrifugal force acts to move said movable contact, and axially movable means for adjusting the speed setting of said switch, said adjusting means engaging said resilient means in such a manner as to vary adjustably the amount of said bias.

10. A centrifugal switch adapted to govern the speed of an electric motor comprising, in combination, a rotatable insulating member, a pair of collector rings carried by said member, a contact electrically connected to one of said collector rings, said contact being fixedly mounted off-center relative to said member with its contact face parallel to the plane of rotation of said collector rings, a movable contact for cooperation with said fixedly mounted contact, a resiliently mounted centrifugally actuated arm for carrying said movable contact, said arm extending on the diametrically opposite side of the axis of rotation of said member from said fixed contact and being electrically connected to the other of said collector rings, means movable along the axis of rotation of said member for adjusting the speed at which centrifugal force actuates said arm to move said movable contact relative to said fixed contact, and resilient connecting means interposed between said arm and said adjusting means.

11. A centrifugal switch adapted to govern automatically the speed of an electric motor comprising, in combination, a rotatable insulating member, a pair of collector rings carried thereby, an off-center fixed contact electrically connected to one of said collector rings, said contact being mounted on said switch with its contact face parallel to the plane of rotation of said collector rings, an off-center resilient electrical conducting member electrically connected to the other of said collector rings, said resilient member being mounted on said switch symmetrically with respect to a line passing through said fixed contact and the axis of rotation of said insulating member, a centrifugally actuated relatively rigid electrical conducting arm having one end thereof fastened to said resilient member and having the other end thereof carrying a movable contact for making vibratory engagement with said fixed contact, the center line of said arm passing through the axis of rotation of said rotatable member, and means for adjusting the speed setting of said switch comprising a device movable parallel to the axis of rotation of said switch for flexing said resilient electrical conducting member.

ROBERT W. GROOT.